June 17, 1958 J. LAMBERTI 2,838,774
SWIMMING AND WATER PROPELLING DEVICE
Filed Jan. 27, 1955 2 Sheets-Sheet 1
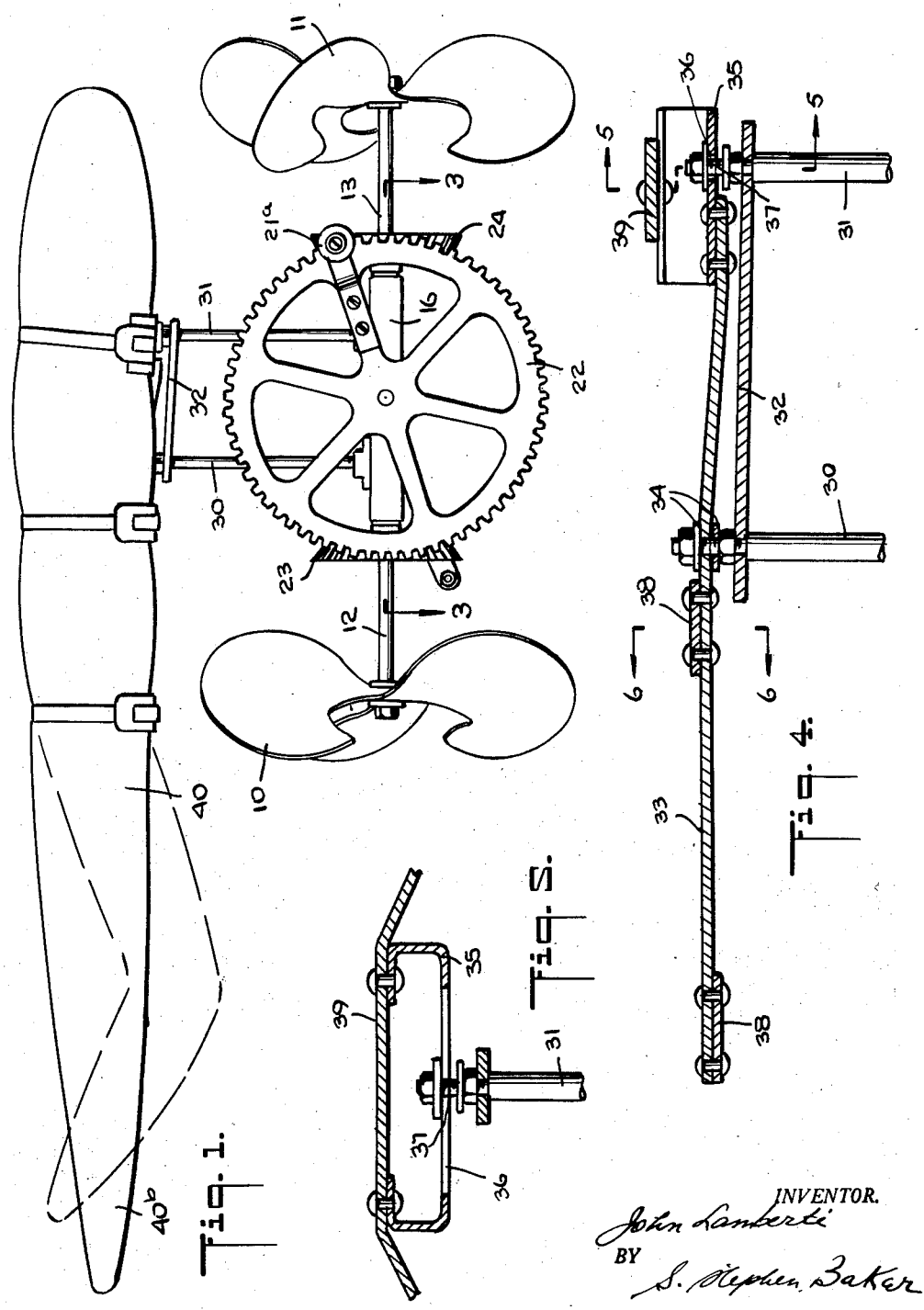
INVENTOR.
John Lamberti
BY
S. Stephen Baker
ATTORNEY

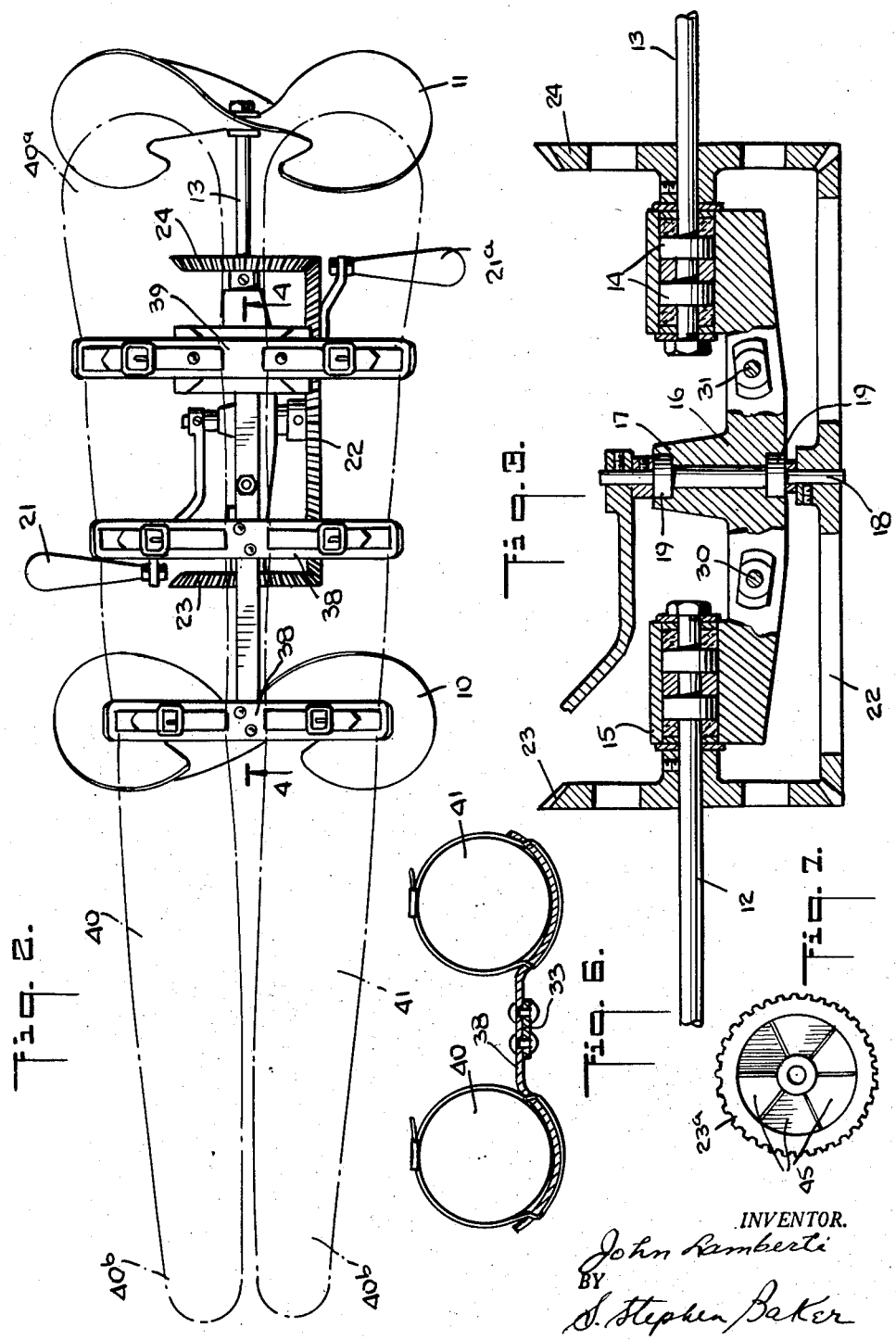

United States Patent Office 2,838,774
Patented June 17, 1958

2,838,774

SWIMMING AND WATER PROPELLING DEVICE

John Lamberti, New York, N. Y.

Application January 27, 1955, Serial No. 484,440

3 Claims. (Cl. 9—18)

This invention relates to a swimming or water propelling device and takes the form of a simple vehicle by which a user may propel himself in the water.

The principal object of this invention is to provide a simplified structure which will support a person in a floating position in the water while enabling him to steer and to propel himself at a fairly high rate of speed. The elongated floats employed provide effective balancing means while specially driven propelling means serve to provide balanced and effective propulsion.

The invention will be further understood from the following description and drawings in which:

Figure 1 is an elevational view of the article;

Figure 2 is a top plan view thereof;

Figure 3 is an enlarged cross-sectional view as taken along the line 3—3 of Figure 1;

Figure 4 is an enlarged cross-sectional view as taken along the line 4—4 of Figure 2;

Figure 5 is a cross-sectional view as taken along the line 5—5 of Figure 4;

Figure 6 is a cross-sectional view as taken along the line 6—6 of Figure 4; and

Figure 7 is a plan view of a modification of the driven bevel gears.

The article comprises a pair of screw propellers 10 and 11 respectively secured to and driven by shafts 12 and 13. Shafts 12 and 13 are rotated in spaced bearings 14 maintained within chambers 15 formed at opposite ends of the frame piece 16.

Frame piece 16 is formed with a center hub 17 through which extends drive shaft 18 rotatably supported in bearings 19. To one reduced end of drive shaft 18 is connected crank 20 having a handle 21 for rotating the shaft 18.

The other reduced end of shaft 18 is connected to a large driving wheel or gear 22, this being a bevel gear. Secured, as by to one spoke of the gear 22, is a second crank and handle 21a whereby the user may grasp a handle in each hand and effect rapid rotation of driving gear 22.

A pair of driven gears 23 and 24 are respectively secured to the shafts 12 and 13. Gears 23 and 24 are bevel gears driven by large gear 22 so that said driven gears rotate in opposite directions. Shafts 12 and 13 extend further outwardly than gears 23 and 24 and support the propellers 10 and 11 at their respective ends. Accordingly, manual rotation of the handles will effect rapid rotation of the propellers, the gear ratio between gear 22 and the gears 23 and 24 being such that the speed is stepped up. For example, the gear ratio may be two to one or greater.

Secured to frame piece 16 are a pair of vertical arms 30 and 31 having a spacer bar 32 at their top ends. Arm 30 rotatably supports horizontal bar 33, said bar 33 being pivoted to the upper end of arm 30 between washers 34 as illustrated in Figure 4.

The front end of bar 33 supports a narrow chamber 35 which is formed with a bottom transverse slot 36.

The upper end of vertical arm 31 is slidably received in slot 36, the washer 37 overlapping said slot as illustrated in Figure 4. Accordingly, as the bar 33 is pivoted on arm 30, chamber 35 describes an arc which is limited by the ends of the transverse slot 36.

Across bar 33 are secured transverse, spaced bars 38, a similar transverse bar 39 being secured across the top of chamber 35. Transverse bars 38 and 39 are concave at their ends so as to support elongated float tubes 40 and 41. The float tubes are laid lengthwise and substantially parallel to each other across the aligned concave ends of the transverse bars 38 and 39. These transverse bars are formed with end slots through which are drawn straps 42 for securing the float tubes to the bars.

Float tubes 40 and 41 may be inflated rubber or plastic tubes whereupon they will have a degree of resiliency and comfort in use. In the form shown, they taper downwardly from a greater diameter at the front 40a to a smaller diameter at the rear 40b. As such, the combined smaller ends 40b may be comfortably received between the legs of a user as will be hereinafter described.

The article is placed in the water, the float tubes maintaining it upright. The user lies prone, face down, upon the tubes with his chest at about the tube front ends 40a and the tube rear ends 40b between his legs. As noted in the broken lines of Figure 1, the tube rear ends will tend to bend upwardly thus forming a "seat" for the user. This is because the ends tend to float upwardly while the adjacent portions of the tubes are depressed by the user's body.

The user then grasps the handles 21 and 21a and rotates them in opposite directions. This rotates driving gear 22 and produces rapid rotation of gears 23 and 24 and the screw propellers 10 and 11. The article with the user riding and supported upon it will travel through the water at a rate of speed comparable to or exceeding a normal swimming speed. Of course, the user may rest upon the article when he is tired.

The article is well balanced in the water and the drive is likewise balanced since it is symmetrical. It will be further noted that the propellers 10 and 11 are of a diameter exceeding the width of the water float member comprising the combined float tubes 40 and 41. They thus each extend past the side edges of the water float member, and, one of them being disposed forwardly of the water float member and the other approximately centrally thereof, they serve as a steadying influence on the device, both fore and aft.

The user will steer the article by urging the handles in a horizontal plane so as to swing the lower structure thus turning the article. During such steering the front vertical bar 31 will ride in slot 36. Slight movement thereafter of the user's body will re-align the floats and the lower structure.

The bar 33, together with the transverse bars 38, 39 and chamber 35 constitute the frame or support, the water float tubes being detachably secured thereto. The water propulsion means, i. e. the gears, screw propellers etc., may take the form described above although it may be modified in various ways. For example, as shown in Figure 7, the driven gear 23a may have spokes in the form of blades 45 which radiate from the center of the circular gear and which assist in the propulsion of the article. Such blades are pitched in one direction for the front driven gear and in an opposite direction for the rear driven gear. The modified form of blade will assist materially in the speed and force of propulsion and, in fact, may be used alone without the screw propellers.

There has been shown what I now consider to be a preferred form of the invention but it is obvious that numerous changes and omissions may be made without departing from the spirit thereof. For example, the float tubes may be formed of conventional float materials such as cork or the like. In addition, a gasoline motor drive may be used to actuate the gears while still retaining many of the novel features described herein.

What is claimed is:

1. An article of the character described comprising a support, a water float member mounted on said support, water propulsion means mounted to and depending downwardly from said support, said water propulsion means being pivotally secured to said support so that it may be steered relative to said support, said water propulsion means comprising gear means, and means to manually actuate said gear means, said gear means comprising at least one circular gear with a plurality of water propelling blades radiating from the center of the gear.

2. An article of the character described comprising a support, float tube means connected to said support for maintaining a person in the water in substantially prone position, said float tube means being wider at the front end than at the rear end so that said rear end may be insertable between the legs of the person, water propulsion means connected to said support, means to steer said support relative to said water propulsion means, said float tube means comprising a pair of separated, elongated, substantially parallel tubes which are inflated and flexible so that their narrower rear ends may be bent upwardly by the action of the water between the person's legs, a vertical arm on said water propulsion means, said support being formed with a transverse slot in which said arm rides for steering of said support relative to said water propulsion means, said water propulsion means comprising a driving gear, a pair of handles connected to said driving gear for actuating it, a pair of oppositely rotating driven gears actuated by said driving gear, and a pair of oppositely driven screw propellers rotated by said driven gears, and each of said driven gears comprising a plurality of water propelling blades radiating from the center of the gear.

3. An article of the character described comprising a horizontal, elongated supporting bar, a water float member mounted on said bar and adapted to support the body of a person, water propulsion means mounting to and depending downwardly from said bar, said water propulsion means comprising a driving gear, propeller means driven by said driving gear, a pair of handles connected to said driving gear for actuating it, said handles being disposed wholly below said water float member and extending laterally outwardly of said water float member whereby said handles may be grasped and actuated by the hands of a person lying on said water float member while his hands are extending downwardly below and on both sides of said water float member, a pair of oppositely rotating, circular, driven gears actuated by said driving gear, said propeller means comprising a pair of oppositely driven screw propellers rotated by said driven gears, and said water propulsion means including a frame piece secured to said supporting bar, said gears all being journalled in said frame piece, one of said screw propellers being disposed forwardly of the front end of said bar and forwardly of said water float member, and the other screw propeller being disposed at the rear end of said bar, both of said propellers being of the same diameter, said diameter being greater than the width of said water float member whereby said propellers function as a steadying influence on said water float member both fore and aft.

References Cited in the file of this patent

UNITED STATES PATENTS

| | | |
|---|---|---|
| 901,862 | Zetterberg | Oct. 20, 1908 |
| 1,030,525 | Myers | June 25, 1912 |
| 1,321,267 | Wilson | Nov. 11, 1919 |

FOREIGN PATENTS

| | | |
|---|---|---|
| 373,531 | Italy | July 28, 1939 |